(No Model.)

C. W. KOLB.
BREAD BAKING PAN.

No. 592,058. Patented Oct. 19, 1897.

Witnesses:
John Becker.
William Miller.

Inventor:
Charles W. Kolb
by his attorneys
Roeder & Briesen

UNITED STATES PATENT OFFICE.

CHARLES W. KOLB, OF PHILADELPHIA, PENNSYLVANIA.

BREAD-BAKING PAN.

SPECIFICATION forming part of Letters Patent No. 592,058, dated October 19, 1897.

Application filed June 10, 1897. Serial No. 640,122. (No model.)

*To all whom it may concern:*

Be it known that I, CHARLES W. KOLB, a citizen of the United States, and a resident of Philadelphia, in the county of Philadelphia and State of Pennsylvania, have invented certain new and useful Improvements in Bread-Baking Pans, of which the following is a specification.

This invention relates to a bread-baking pan constructed to form a loaf with large straight crusts thoroughly browned, which constitutes a superior food product.

Figure 1:
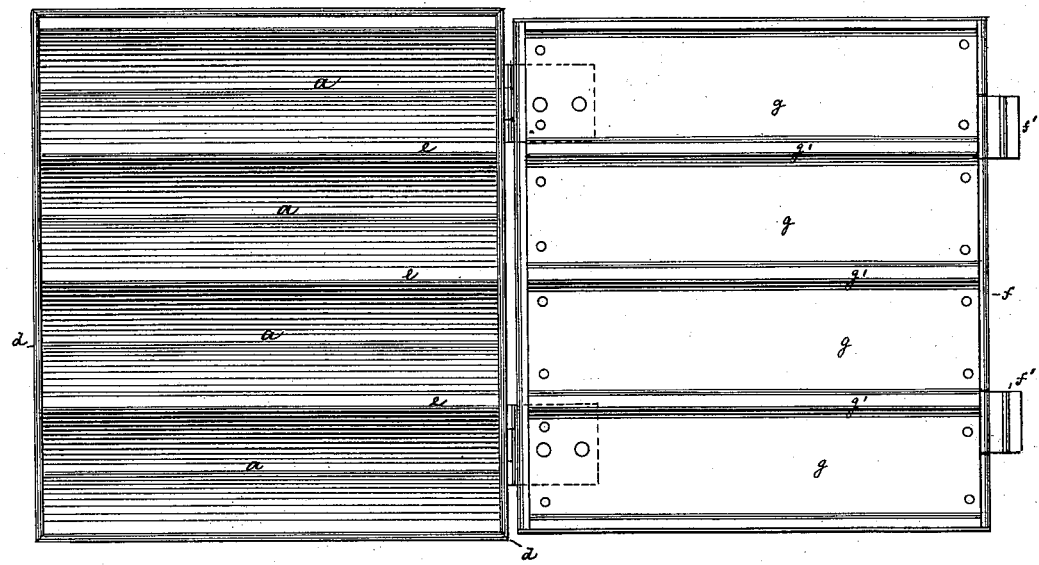
Figure 2:
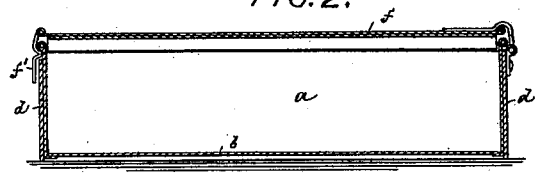
Figure 3:
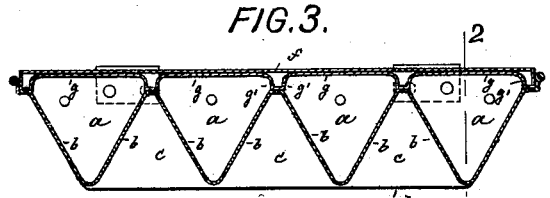
Figure 4:
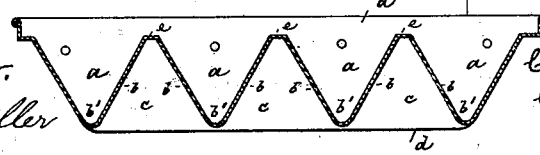

In the accompanying drawings, Figure 1 is a plan of my improved baking-pan, showing it open. Fig. 2 is a vertical longitudinal section thereof on line 2 2, Fig. 3. Fig. 3 is a cross-section of the pan, showing it closed; Fig. 4, a similar section with the cover removed, and Fig. 5 a detail of the joint between partition and cover.

The pan is formed with a number of molds $a$, placed side by side, and of which each is of triangular shape in cross-section. To obtain this effect the sheet-metal-bottom plate $b$ of the pan is bent alternately up and down at an acute angle to form the upper triangular troughs or molds $a$, the lower triangular heating-spaces $c$, and the intervening inclined partitions. At both ends the molds $a$, as well as the heating-spaces $c$, are closed by plates $d$ of a height to project above the apexes of the triangular partitions formed between the molds, which apexes I make flat or truncated, as at $e$, Figs. 4 and 5.

The lid $f$ of the pan is hinged to one of the plates $d$, and is provided with suitable catches $f'$, adapted to engage the opposite plate.

To the inner face of the lid is secured a plate $g$, provided with depending projections or flanges $g'$, that enter the pan-body and rest upon the truncated apexes of the partitions when the lid is closed. I prefer to make the top $g$ of each mold equal in breadth to the height of one of the walls of the partition $b$, so that the bread formed by the mold will be of equilateral triangular shape in cross-section.

Figure 5:
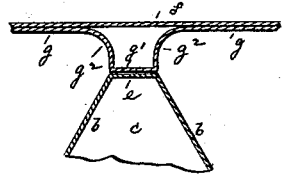

The angles $g^2$, between the parts $g$ and $g'$, Fig. 5, as well as the lower angle $b'$, between the inclined walls of partition $b$, Fig. 4, should be rounded, so that a loaf with corresponding blunt edges is turned out, which blunt edges are desirable because not liable to become chipped.

It will be seen that by my construction the partitions are sunk beneath the upper edge of the pan-body to be met by the depending projections on the lid. Thus the meeting edge between the top and bottom of each mold is in a different horizontal plane from that between the meeting edge of the pan-body and its lid. The advantage resulting from this construction is that the dough is thoroughly protected against direct heat and that thus no uneven baking or objectionable streaking of the loaf can take place.

What I claim is—

1. A bread-baking pan composed of a pan-body having molds that are sunk beneath the upper edge of the pan-body, and a lid having depending projections that are adapted to enter the pan-body and engage the walls of the molds when the lid is closed, substantially as specified.

2. A bread-baking pan composed of a bottom plate bent to form a series of molds and intervening truncated triangular partitions, end plates extending above the flattened apexes of said partitions, a hinged lid, and depending projections on said lid that are adapted to enter the pan-body and rest upon said truncated apexes when the lid is closed, substantially as specified.

Signed at Philadelphia, in the county of Philadelphia and State of Pennsylvania, this 8th day of June, A. D. 1897.

CHARLES W. KOLB.

Witnesses:
HARRY GREEN,
ALBERT G. SMITH.